US009058690B2

(12) United States Patent
Burley et al.

(10) Patent No.: US 9,058,690 B2
(45) Date of Patent: Jun. 16, 2015

(54) RAY CONE HIERARCHY RENDERER

(71) Applicant: Disney Enterprises, Inc., San Diego, CA (US)

(72) Inventors: Brent Burley, Monterey Park, CA (US); Christian Eisenacher, Burbank, CA (US); Gregory Nichols, North Hollywood, CA (US); Andrew Selle, Montrose, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 357 days.

(21) Appl. No.: 13/651,218

(22) Filed: Oct. 12, 2012

(65) Prior Publication Data

US 2014/0098086 A1    Apr. 10, 2014

Related U.S. Application Data

(60) Provisional application No. 61/710,614, filed on Oct. 5, 2012.

(51) Int. Cl.
  *G06T 15/06*    (2011.01)
  *G06T 15/08*    (2011.01)
(52) U.S. Cl.
  CPC ..................................... *G06T 15/06* (2013.01)

(58) Field of Classification Search
  CPC ..... G06T 15/06; G06T 15/08; G06T 2210/52; G06T 11/005; G06T 11/006; G06T 2211/412; G06T 2211/421
  USPC .......................................................... 345/419
  See application file for complete search history.

(56) References Cited

U.S. PATENT DOCUMENTS

| 8,284,188 | B1 * | 10/2012 | Lauterbach et al. | 345/419 |
| 2009/0096788 | A1 * | 4/2009 | Salsbury et al. | 345/426 |
| 2009/0128562 | A1 * | 5/2009 | McCombe et al. | 345/427 |
| 2012/0169728 | A1 * | 7/2012 | Mora | 345/419 |

OTHER PUBLICATIONS

Roger et al., Whitted Ray-Tracing for Dynamic Scenes using a Ray-Space Hierarchy on the GPU, Eurographics Symposium on Rendering (2007), pp. 99-110.*

* cited by examiner

*Primary Examiner* — Kee M Tung
*Assistant Examiner* — Haixia Du
(74) *Attorney, Agent, or Firm* — Sheppard Mullin Richter & Hampton LLP

(57) ABSTRACT

Some aspects of the disclosure include systems and methods for grouping rays into sets according to their directions. In some cases, the rays of the directional sets may then be organized into a hierarchy according to their origins and bounding cones are generated for the hierarchy nodes. The resulting bounding cone hierarchy may be intersected with a bounding volume hierarchy or other scene hierarchy.

23 Claims, 7 Drawing Sheets

RAY CONE HIERARCHY RENDERER

CROSS-REFERENCE TO RELATED APPLICATION

This application claims the benefit of U.S. Provisional Application No. 61/710,614, which is hereby incorporated in its entirety.

TECHNICAL FIELD

The present application relates generally to computer animation, and more particularly, some embodiments relate to ray tracing.

DESCRIPTION OF THE RELATED ART

Ray tracing is a technique for generating an image by tracing the path of light through pixels in an image plane and simulating the effects of its encounters with virtual objects. The technique is capable of producing a very high degree of visual realism, usually higher than that of typical scanline rendering methods, but at greater computational and memory costs.

BRIEF SUMMARY

Some aspects of the disclosure include systems and methods for grouping rays into sets according to their directions. In some cases, the rays of the directional sets may then be organized into a hierarchy according to their origins and bounding cones are generated for the hierarchy nodes. The resulting bounding cone hierarchy may be intersected with a bounding volume hierarchy or other scene hierarchy.

Other features and aspects will become apparent from the following detailed description, taken in conjunction with the accompanying figures. The summary is not intended to limit the scope of the application, which is defined solely by the claims attached hereto.

BRIEF DESCRIPTION OF THE FIGURES

The figures are provided for purposes of illustration only and merely depict typical or example embodiments. These figures are provided to facilitate the reader's understanding and shall not be considered limiting of the breadth, scope, or applicability of the invention.

DETAILED DESCRIPTION OF THE EMBODIMENTS OF THE DISCLOSURE

Tracing rays or cone, one at a time, is memory and processing intensive. Even with a scene hierarchy, large numbers of rays require high amounts of memory bandwidth to traverse the queries across scene nodes and perform the large number of intersection computations.

Figure 1:
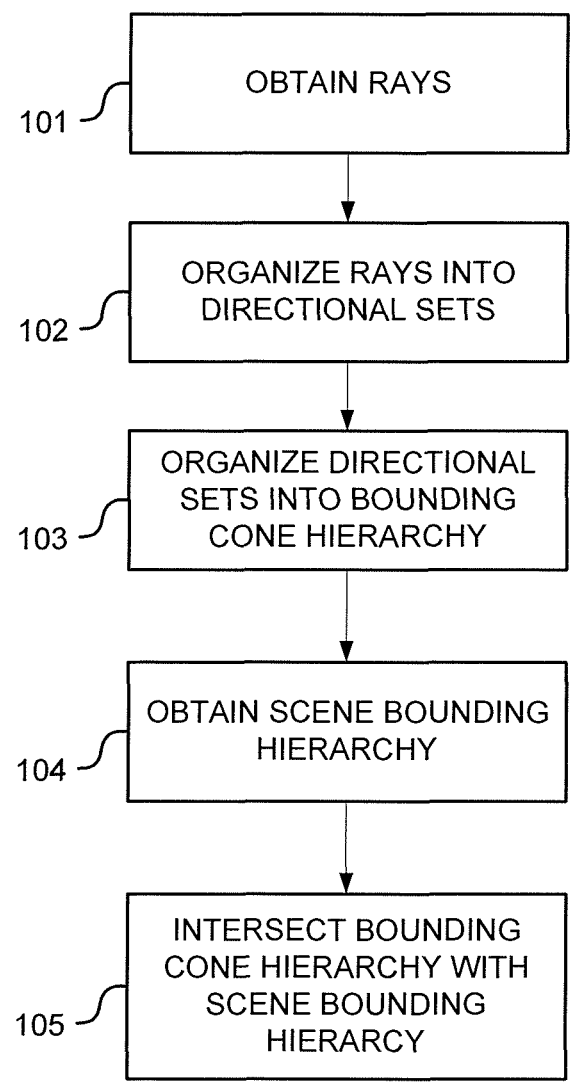
FIG. 1 illustrates a method of operation of a ray cone hierarchy ray tracing renderer.

FIG. 1 illustrates an example method for intersecting rays with a scene in a ray tracing scene rendering system. In step 101, rays are obtained for processing. This may include obtaining rays 101 by generating camera rays, generating reflection rays, generating refraction rays, generating shadow rays, generating light rays, or generating any other rays utilized during conventional ray tracing rendering processes. The obtained rays may be a single ray type or a mixture of different ray types. In some cases, the step of obtaining rays 101 includes loading all of the rays that will be used in the method into memory. In other cases, subsets of the entire set of rays may be loaded into memory for iterative processing.

In step 102, the rays are organized or classified into directional groups according to the rays' directions. Each ray may be described as a vector comprising an origin in a three-dimensional space, and a three-dimensional direction. Each directional group comprises rays having directions falling within a three-dimensional directional boundary for the directional group. Conceptually, the directional sphere, or a portion thereof, is partitioned into boundaries. The rays are grouped into the directional groups according to their encompassing boundaries. The grouping may be performed based only on the direction of the rays without regard to their origins.

Figure 2:
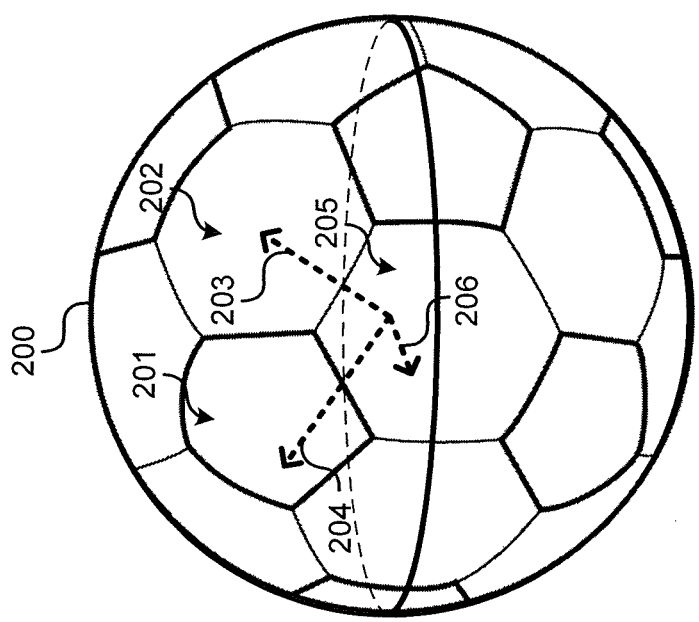
FIG. 2 illustrates an example of division of rays into directional groups.

As an example, FIG. 2 shows a unit directional sphere that illustrates the grouping 102 of rays into directional groups. The unit sphere 200 is partitioned into a plurality of directional ranges 202, 201, 205. The rays' directions are then used to group the rays into the corresponding directional ranges. For example, rays 204 having a direction falling within the range 201 are grouped into a first directional group; rays 203 having a direction falling within the range 202 are grouped into a second directional group; and rays 206 having a direction falling within the range 205 are grouped into a third directional group.

In the illustrated case, the directional sphere is partitioned into the boundaries subtended by a truncated icosahedron, and is therefore composed of pentagonal ranges 201 and hexagonal ranges 202. In other cases, the directional sphere can be partitioned into ranges in other manners—for example, other polyhedra may be employed, or the sphere can be partitioned into irregularly shaped ranges. In still further cases, only a portion of the directional sphere is used. For example, for camera rays, the hemisphere facing the scene may be partitioned for directional ray grouping.

Although the rays 203, 204, and 206 are illustrated as having a common origin, rays may be organized into directional groups without regard to origin. For example, the rays may be stored as data elements having an origin and a direction. Alternatively, the rays may have their directions determined from their native storage format. For example, in step 102, the rays may be temporarily translated to a common origin for organization into the directional groups. As another example, in step 102, the direction of each ray may be independently evaluated in a spherical coordinate system having a common origin to the ray. Any other method of evaluating the rays' directions may also be used.

In some cases, the directional groups may have a maximum number of rays per group. The maximum number of rays may be determined according to various considerations, such as coherence requirements and processing time. For example, a maximum number of between 10 million to 100 million may be suitable to provide sufficient coherence for ray tracing rendering without excessive processing time requirements. When a maximum number of rays per group is employed and a directional group is filled, additional directional groups corresponding to the same directional range may be used to store additional rays. Alternatively, additional rays may be discarded or saved for a future processing iteration.

In the implementation illustrated in FIG. 2, the directional groups have predetermined directional boundaries. In other implementations, the boundaries for the directional groups may be determined during ray processing. In one implementation, directional groups are added until a predetermined number of groups are reached. For example, when a group has reached a certain number of rays, the group may be partitioned. This process may continue until the maximum number of directional groups are reached.

Step 102 may continue until any of various conditions are met. For example, in some cases, step 102 continues until all rays obtained in step 101 are organized into directional groups. In other cases, step 102 continues until a predetermined number of directional groups are filled. In still further cases, step 102 continues until at least one directional group for each directional range is filled.

In other implementations, steps 101 and 102 may be performed simultaneously. For example, every time a ray is generated during ray tracing, a method may be called to place that ray into a directional group. In these implementations, each time a directional group is filled, it may be organized into a bounding cone hierarchy (as described below) and intersected with the scene.

Figure 3:
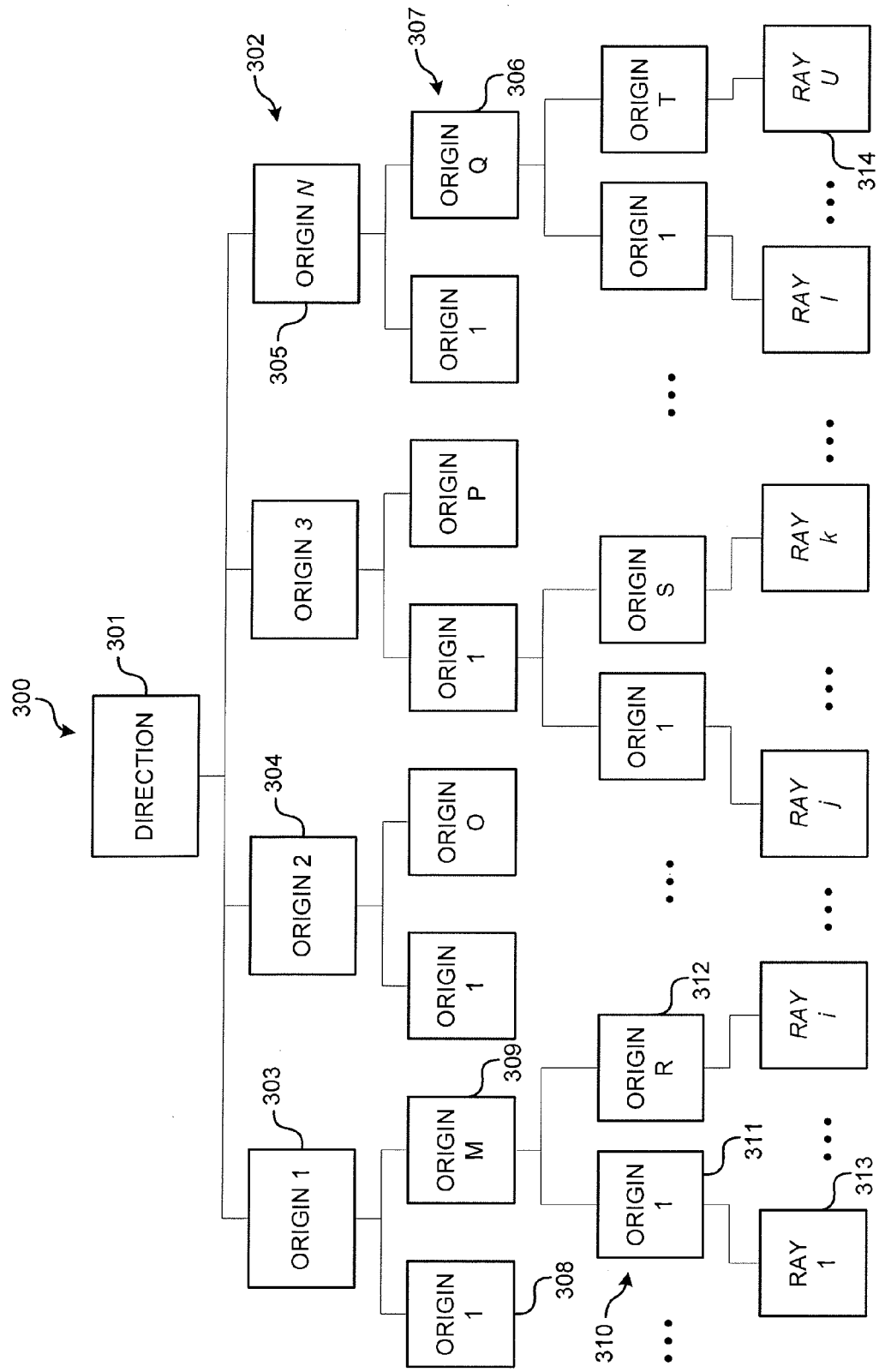
FIG. 3 illustrates an example bounding cone hierarchy.

After step 102, the directional groups are organized into a bounding cone hierarchy. FIG. 3 illustrates an example of a bounding cone hierarchy data structure 300 of the type that may be generated in step 103. Bounding cone hierarchy 300 has a tree structure having a root 301 comprising one of the directional groups generated in step 102. The leaf nodes of the tree 300 are the individual rays 313, . . . , 314 of the directional group 301. In other implementations, the leaf nodes of the tree 300 are the lowest level of origin subgroups (as described below). The rays are further contained in one or more subset levels 302, 307, 310 of origin-based sub-groups.

Each set of daughter subgroups is a sorting of the parent group by origin. For example, directional group 301 is sorted into N daughter origin subgroups 303, 304, . . . , 305. Origin subgroup 303 is sorted into M daughter origin subgroups 308, 309. Origin subgroup 309 is sorted into R daughter origin subgroups 311, 312, and so on until ray nodes 313, . . . , 314. In some implementations, each group has two daughter subgroups (i.e., N, M, R, . . . =2). In other implementations, the number of daughter subgroups is a predetermined power of two, or some other integer. The sorting of the rays into the origin subgroups may be performed in various manners. For example, various selection algorithms, such as partitioned-based general selection algorithms, or nth element selection algorithms may be used to sort or partially sort the rays in a parent group into daughter subgroups.

In the illustrated tree 300, only three levels of origin subgroups are present. In other implementations, greater or fewer levels may be employed. In a particular implementation, each node has two daughter nodes and there are three or four levels (to provide 16 or 32 origin subgroup leafs).

Additionally, in some implementations the sub-levels 302, 307, 310 may be sorted based on direction as well as origin. For example, level 307 may be based on further partitioning of the origin subgroups 303, 304, 305 into directional subgroups. Indeed, the levels of the hierarchy may alternate in any order of directional or origin based groupings.

Figure 4:
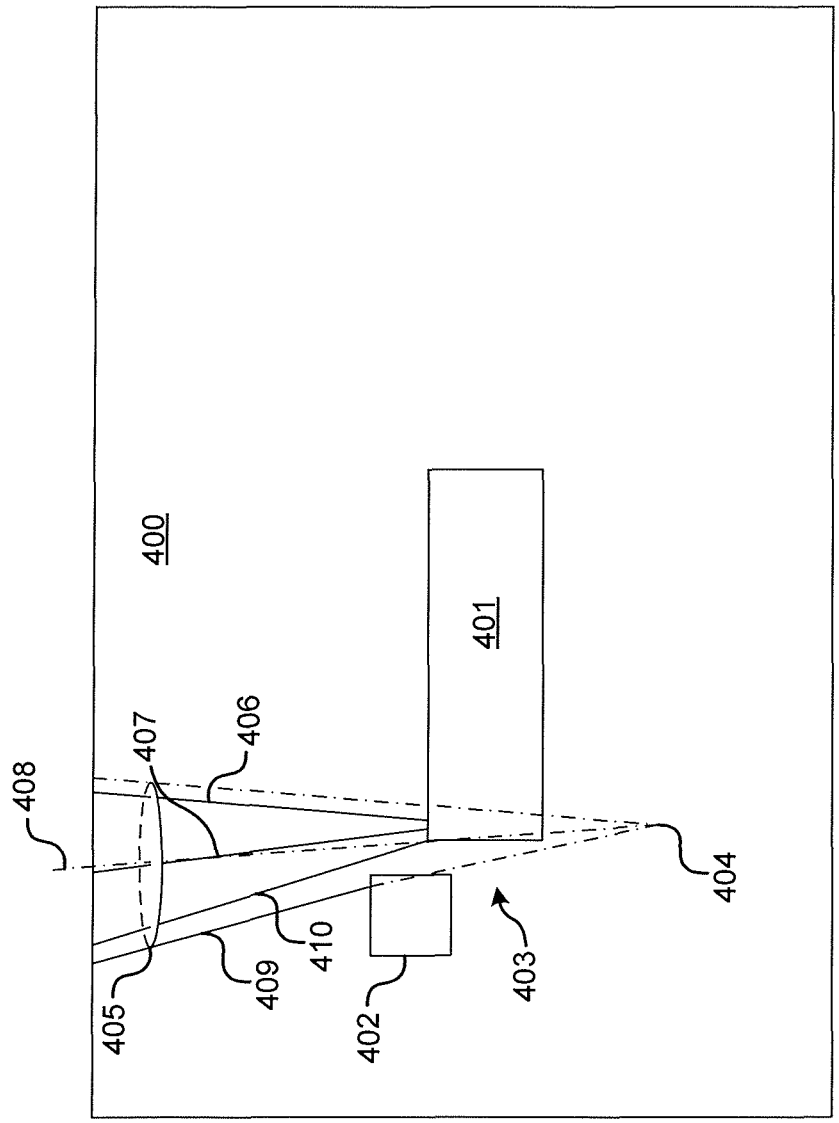
FIG. 4 illustrates an example of generation of a bounding cone for a ray group.

The bounding cone hierarchy 300 further comprises a bounding cone for each node of the tree. In some cases, the bounding cones are circular cones generated to encompass the rays contained in the node. FIG. 4 illustrates an example of a bounding cone. In this example, rays 406, 407, 409, and 410 are reflection or refraction rays with origins located on scene objects 401 or 402 in the scene 400. In particular, the rays 406, 407, 409, and 410 are the members of a directional group or an origin subgroup. A bounding cone 403 for the set of rays is generated to encompass the rays 406, 407, 409, 410.

The bounding cone 403 is generated by finding an axis 408 for the cone by averaging the rays 406, 407, 409, 410 of the group. Then, the ray having the highest deviation (ray 409 in FIG. 4) from the axis 408 is used to define a circular boundary 405 for the cone. The cone is then defined by extending the boundary ray 409 to an apex 404 and generating a right circular cone 403 about the axis 408 with the apex 404 and a solid angle subtending boundary 405. In some cases, the bounding cone 403 may be truncated at the closest ray origin to the apex 404 in the direction defined by the axis 408 (i.e., at the origin of ray 410, 407, or 406). When the bounding cone 403 is truncated, a circular base may be defined perpendicular to the axis 408 and surrounding the closest ray origin(s) so that the truncated cone contains all ray origins. The truncated cone may aid in intersection testing by reducing the cone's bounds. In other implementations, other cone types may be used to generate the bounding cones. For example, oblique circular cones or pyramids—truncated or not—may be used as bounding cones. Additionally, truncated cones may have bases that are oblique to the cones' axes.

Figure 5:
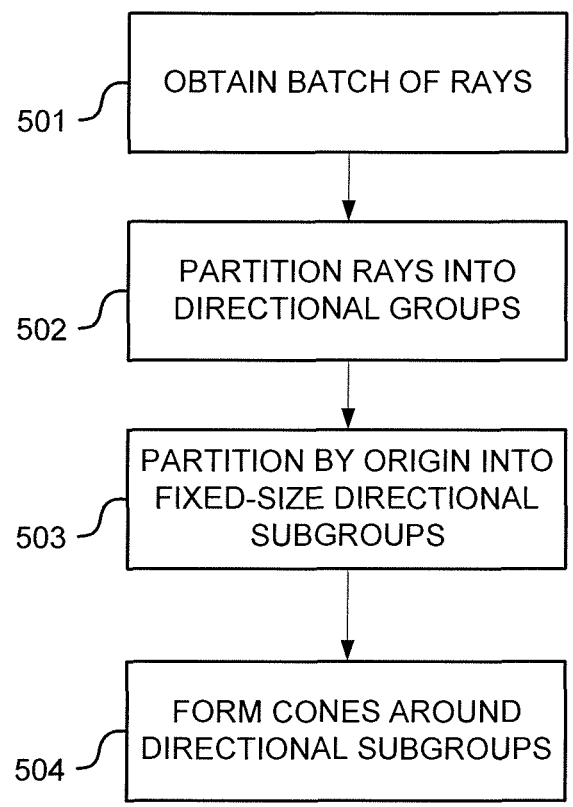
FIG. 5 illustrates an example method of creating a ray cone hierarchy.

FIG. 5 illustrates an example method of creating a bounding ray cone hierarchy. In step 501, a batch of rays is obtained. The batch of rays may be fixed in size or adaptable. In a specific implementation, the batch has a fixed size of up to 32 million rays.

In step 502, the batch of rays is partitioned into a fixed number of directional groups. In a specific implementation, the batch of rays is partitioned into 6 groups by direction.

In step 503, each of the directional groups are partitioned by origin into fixed-size subgroups. In a specific implementation, each directional group is partitioned into origin-based subgroups of 4,096 rays.

In step 504, each of the origin-based subgroups is partitioned into fixed-size directional sub-subgroups. In a specific implementation, each origin-based subgroup is portioned into directional sub-subgroups of 16 rays.

Returning to FIG. 1, in step 104, a scene bounding hierarchy is obtained. The scene bounding hierarchy may comprise a tree of bounding volumes for the scene objects, such as spheres, axis-aligned bounding boxes, oriented bounding boxes, or other bounding volumes.

Various methods for traversing the bounding cone hierarchy and the scene bounding hierarchy for intersection detection may be employed. For example, the scene hierarchy may be provided as a stream of bounding volumes, and the cone hierarchy may be intersected with each element of the stream.

Figure 6:
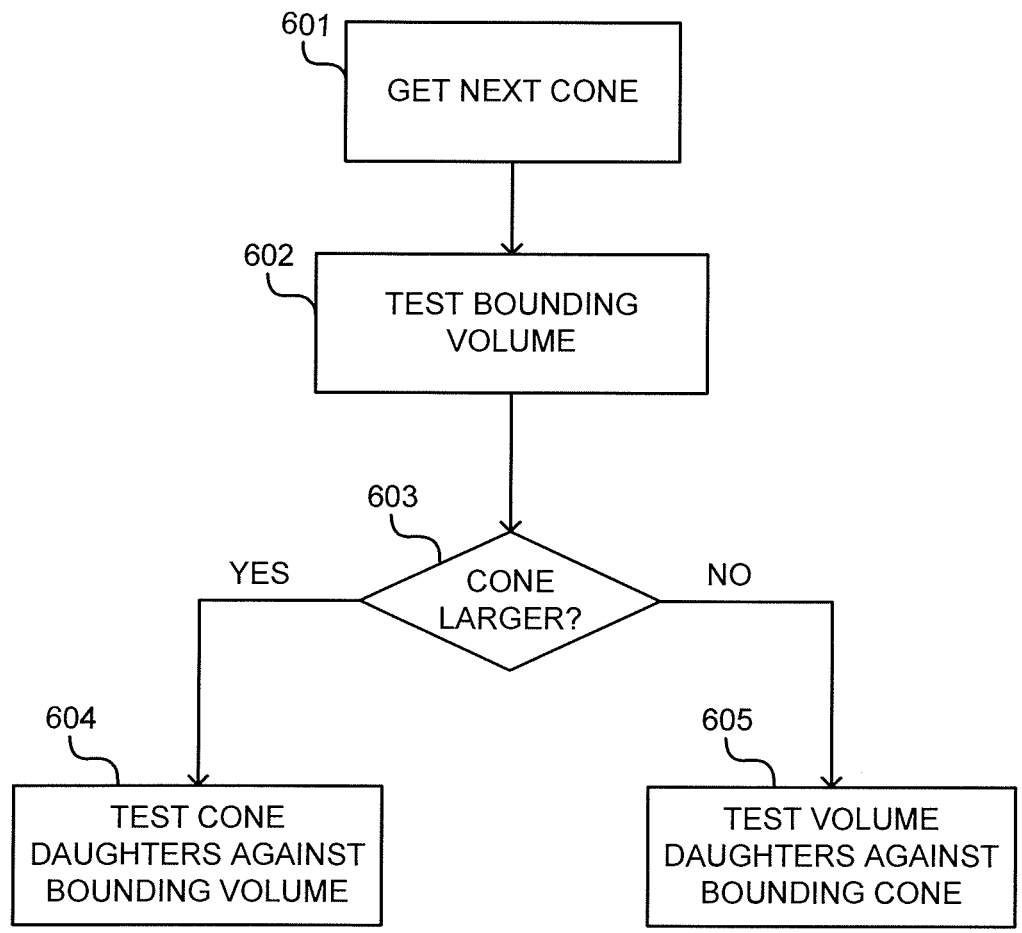
FIG. 6 illustrates an example method for hierarchy traversal.

As another example, the scene bounding hierarchy may be traversed in a hierarchical manner. A particular implementation is illustrated in FIG. 6. In this method, a cone 601 is selected from the current level of the bounding cone hierarchy for testing against the bounding volumes of the current level of the scene bounding hierarchy. In step 602, the bounding volumes of the current level are tested against selected bounding cone. In some cases, the bounding cones are tested in order from front to back, along the direction of the selected cone's axis.

When an intersection is detected between a bounding cone and a scene bounding volume, then the system tests the bounding cone's daughters against the scene bounding volume, or tests the scene bounding volume's daughters against the bounding cone. In step 603, the system determines if the bounding cone or the bounding volume is larger. Many tests for size may be employed. For example, the bounding cone's size may be taken to be the bounding cone's volume, the length of the bounding cone's axis, or the area of the cone's base. The bounding volume's size may be the volume of the bounding volume, the length of one of the bounding volume's axes (such as the length of the longest axis), or the area of a face of the bounding volume (such as the face that first intersects with the cone's axis).

If the bounding cone is larger, then the system tests the cone's daughter nodes against the bounding volume in step 604. If the bounding volume is larger, then the system tests the volume's daughter nodes against the bounding cone in step 605. If further intersections are detected at the daughter levels, the system repeats the determination 603 of which bounding shape is larger and descends into the larger object's daughters.

Processing improvements in other computer graphics systems may be obtained simply from completion of step 103. For example, the bounding cone hierarchy may be used in global illumination algorithms. Additionally, simply reordering the rays according to direction and, optionally, position may provide processing advantages. For example, performing ray tracing against a scene hierarchy with the rays reordered according to direction and position may provide processing improvements over standard ray tracing algorithms.

Where components or modules are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

Figure 7:
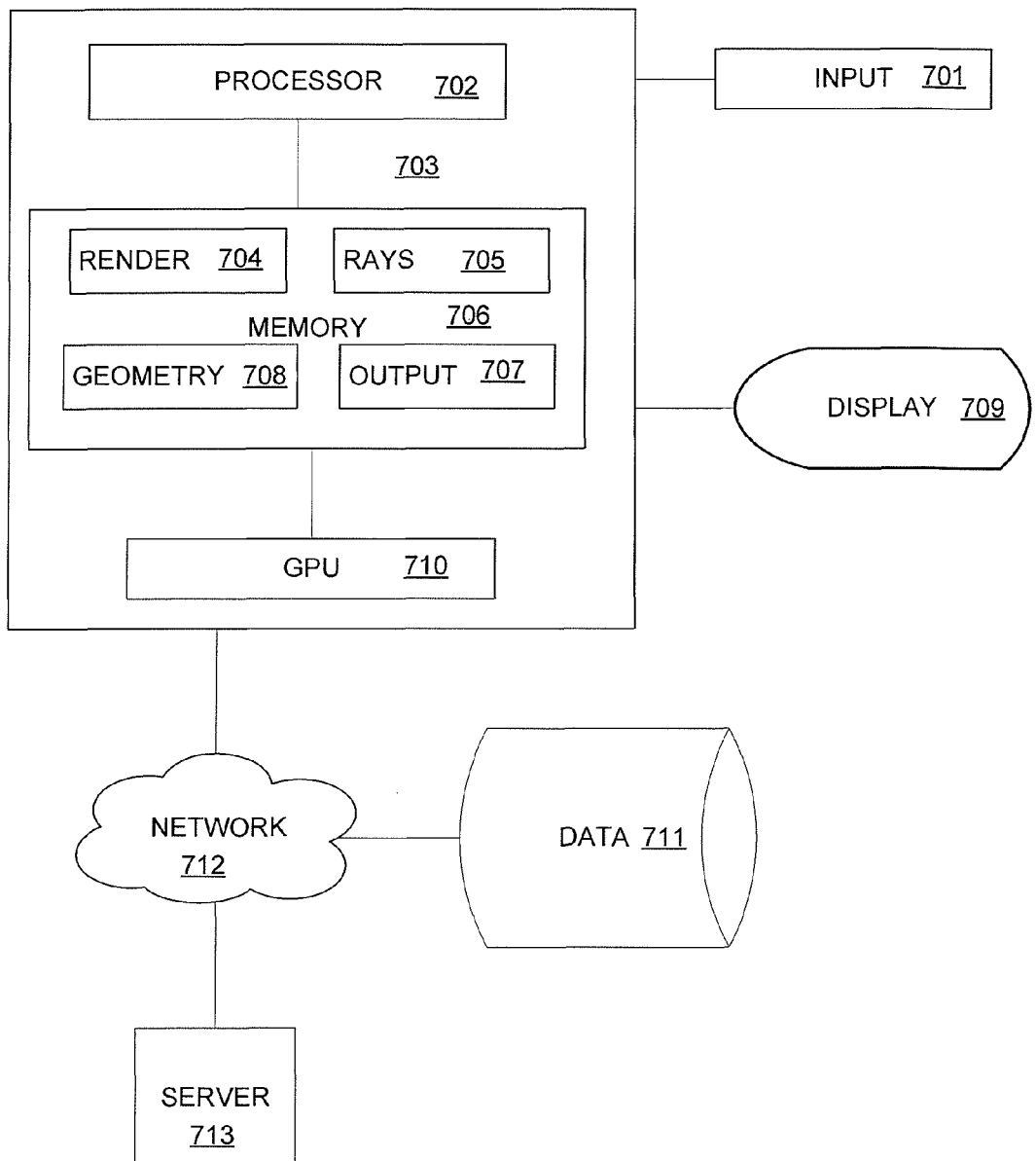
FIG. 7 illustrates an example system for implementation of a bounding cone hierarchy ray tracing renderer.

FIG. 7 presents an exemplary diagram of a system for providing a ray cone hierarchy renderer. The system includes workstation 703, display 709, input device 701, network 712, server 713, and data 711. Workstation 703 includes processor 702, memory 706, and graphics processing unit (GPU) 710. In addition to memory 706, the workstation 703 may include other non-transitory computer readable media, such as non-volatile storage devices. Various data elements and programs may be stored in memory 706. For example, the rendering program 704 may be stored and executed from memory 706. Data that is used by the rendering program 704 may also be stored in memory 706. As described above, such data may include rays 705 and scene geometry data 708. In some cases, all rays 705 that will be used by rendering program 704 are stored in memory 706. In other cases, rays 705 are a subset of the total rays to be processed. Other rays may streamed to the workstation 703 over the network 712 or may be stored in local non-volatile storage. Additionally, the memory 706 may store the rendering program's 704 output image 707.

Workstation 703 may comprise any computing device such as a rackmount server, desktop computer, or mobile computer. A system user may utilize input device 701, for example a keyboard and mouse, to direct the operation of rendering application 704 executing from memory 706 by processor 702. Additionally, aspects of rendering application 704 may be executed by GPU 710. In some implementations, scene data 708 or ray data 705 may be received over network 712 from data store 711 or server 713. Alternatively, some or all of the scene data 708 or ray data 705 may be generated in the workstation 703. Network 712 may be a high speed network suitable for high performance computing (HPC), for example a 10 GigE network or an InfiniBand network.

Once completed, output image 707 may also be copied to non-volatile storage. In some cases, output image 707 is only a single frame. However, in alternative embodiments, the scene data may further include motion data for object geometry 708, in which case several animation frames may be rendered by rendering application 704.

Moreover, some embodiments may render multiple frames of the same scene concurrently, for example to provide alternative camera angles or to provide stereoscopic rendering. Other data may also be stored in data 711, for example virtual camera parameters and camera paths.

While various implementations have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method, comprising:
 receiving a ray of a set of rays, the ray having an origin and a direction;
 sorting the rays into a directional group of a plurality of directional groups, each directional group having a corresponding directional range and comprising rays of the set of rays having directions within the corresponding directional range; and
 generating a conical boundary for the rays of a directional group of the plurality of directional groups, comprising:
  determining an axis for the conical boundary, the axis comprising an average direction of the rays of the directional group;
  determining a set of deviations of the rays of the directional group from the average direction;
  generating a circular boundary for the conical boundary, the circular boundary encompassing a ray having a greatest deviation from the average direction;
  generating an apex for the conical boundary such that the conical boundary comprising the circular boundary and the apex encloses the rays of the directional group; and
  generating a base of the conical boundary such that the base encircles a ray origin of a ray of the directional group that is closest to the apex in the average direction dimension.

2. The method of claim 1, wherein the directional ranges of the directional groups are predetermined to partition at least a portion of a directional sphere.

3. The method of claim 1, further comprising intersecting the conical boundary with a bounding volume of the scene hierarchy to test if a ray contained in the conical boundary may intersect with a scene element contained in the bounding volume.

4. The method of claim 1, further comprising:
 partitioning a directional group into a plurality of directional subgroups; and
 sorting the rays in the directional group into directional subgroups of the plurality of directional subgroups.

5. The method of claim 1, further comprising:
 partitioning a directional group into a plurality of origination subgroups, each origination subgroup of the plurality of origination subgroups comprising rays having origins within a corresponding origin range.

6. The method of claim 5, further comprising:
 storing the rays in a bounding cone hierarchy comprising a plurality of levels,
  a first level of the bounding cone hierarchy comprising the partitioned directional group of the plurality of directional groups, and
  a second level of the bounding cone hierarchy comprising the plurality of origination subgroups.

7. The method of claim 6, further comprising:
 receiving a scene bounding hierarchy;
 determining if a bounding cone of the bounding cone hierarchy intersects a bounding structure of the scene bounding hierarchy; and
 if the bounding cone intersects the bounding volume structure, then:
  if the bounding cone is larger than the bounding volume structure, determining if a child bounding cone the bounding cone intersects the bounding volume structure; or
  if the bounding structure is larger than the bounding cone, determining if the bounding cone intersects a child bounding structure of the bounding volume.

8. The method of claim 1, further comprising storing the rays in a bounding cone hierarchy comprising a plurality of levels, where each level of the plurality of levels comprises directional subgroups or origination subgroups.

9. A non-transitory computer readable medium, comprising an instruction set configured to cause a ray tracing renderer to perform steps of:
 receiving a ray of a set of rays, the ray having an origin and a direction;
 sorting the rays into a directional group of a plurality of directional groups, each directional group having a corresponding directional range and comprising rays of the set of rays having directions within the corresponding directional range; and
 generating a base of a conical boundary such that the base encircles a ray origin of a ray of the directional group that is closest to an apex in an average direction dimension, wherein the conical boundary is generated by:
  determining an axis for the conical boundary, the axis comprising an average direction of the rays of the directional group;
  determining a set of deviations of the rays of the directional group from the average direction; and
  generating a circular boundary for the conical boundary, the circular boundary encompassing a ray having a greatest deviation from the average direction, the apex for the conical boundary being generated such that the conical boundary comprising the circular boundary and the apex encloses the rays of the directional group.

10. The non-transitory computer readable medium of claim 9, wherein the directional ranges of the directional groups are predetermined to partition at least a portion of a directional sphere.

11. The non-transitory computer readable medium of claim 9, further comprising intersecting the conical boundary with a bounding volume of the scene hierarchy to test if a ray contained in the conical boundary may intersect with a scene element contained in the bounding volume.

12. The non-transitory computer readable medium of claim 9, wherein the instruction set is further configured to cause the ray tracing renderer to perform steps of:
 partitioning a directional group into a plurality of directional subgroups; and
 sorting the rays in the directional set into directional subgroups of the plurality of directional subgroups.

13. The non-transitory computer readable medium of claim 9, wherein the instruction set is further configured to cause the ray tracing renderer to perform a step of:
 partitioning a directional group into a plurality of origination subgroups, each origination subgroup of the plurality of origination subgroups comprising rays having origins within a corresponding origin range.

14. The non-transitory computer readable medium of claim 13, wherein the instruction set is further configured to cause the ray tracing renderer to perform a step of:
 storing the rays in a bounding cone hierarchy comprising a plurality of levels,
 a first level of the bounding cone hierarchy comprising the partitioned directional group of the plurality of directional groups, and
 a second level of the bounding cone hierarchy comprising the plurality of origination subgroups.

15. The non-transitory computer readable medium of claim 14, wherein the instruction set is further configured to cause the ray tracing renderer to perform steps of:
 receiving a scene bounding volume hierarchy;
 determining if a bounding cone of the bounding cone hierarchy intersects a bounding volume structure of the scene bounding volume hierarchy; and
 if the bounding cone intersects the bounding volume structure, then:
  if the bounding cone is larger than the bounding volume structure, determining if a child bounding cone the bounding cone intersects the bounding volume structure; or
  if the bounding volume structure is larger than the bounding cone, determining if the bounding cone intersects a child bounding volume structure of the bounding volume.

16. The non-transitory computer readable medium of claim 9, wherein the instruction set is further configured to cause the ray tracing renderer to perform a step of storing the rays in a bounding cone hierarchy comprising a plurality of levels, where each level of the plurality of levels comprises directional subgroups or origination subgroups.

17. A system, comprising:
 a processor;
 a memory, comprising a program configured to cause the processor to perform steps of:
  receiving a ray of a set of rays, the ray having an origin and a direction;
  sorting the rays into a directional group of a plurality of directional groups, each directional group having a corresponding directional range and comprising rays of the set of rays having directions within the corresponding directional range; and
  generating a base of a conical boundary for the rays of a directional group of the plurality of directional groups such that the base encircles a ray origin of a ray of the directional group that is closest to an apex in an average direction dimension, the conical boundary for the rays of a directional group of the plurality of directional groups being generated by:
   determining an axis for the conical boundary, the axis comprising the average direction of the rays of the directional group;
   determining a set of deviations of the rays of the directional group from the average direction; and
   generating a circular boundary for the conical boundary, the circular boundary encompassing a ray having a greatest deviation from the average direction, the apex for the conical boundary being generated such that the conical boundary comprising the circular boundary and the apex encloses the rays of the directional group.

18. The system of claim 17, wherein the directional ranges of the directional groups are predetermined to partition at least a portion of a directional sphere.

19. The system of claim 17, wherein the program is further configured to cause the processor to perform steps of:
 partitioning a directional group into a plurality of directional subgroups; and
 sorting the rays in the directional set into directional subgroups of the plurality of directional subgroups.

20. The system of claim 17, wherein the program is further configured to cause the processor to perform a step of:
 partitioning a directional group into a plurality of origination subgroups, each origination subgroup of the plurality of origination subgroups comprising rays having origins within a corresponding origin range.

21. The system of claim 20, wherein the program is further configured to cause the processor to perform a step of:
 storing the rays in a bounding cone hierarchy comprising a plurality of levels,
 a first level of the bounding cone hierarchy comprising the partitioned directional group of the plurality of directional groups, and
 a second level of the bounding cone hierarchy comprising the plurality of origination subgroups.

22. The system of claim 21, wherein the program is further configured to cause the processor to perform steps of:
 receiving a scene bounding volume hierarchy;
 determining if a bounding cone of the bounding cone hierarchy intersects a bounding volume structure of the scene bounding volume hierarchy; and
 if the bounding cone intersects the bounding volume structure, then:
  if the bounding cone is larger than the bounding volume structure, determining if a child bounding cone the bounding cone intersects the bounding volume structure; or
  if the bounding volume structure is larger than the bounding cone, determining if the bounding cone intersects a child bounding volume structure of the bounding volume.

23. The system of claim 20, wherein the program is further configured to cause the processor to perform a step of storing the rays in a bounding cone hierarchy comprising a plurality of levels, where each level of the plurality of levels comprises directional subgroups or origination subgroups.

* * * * *